C. CRISMAN.
GARDEN IMPLEMENT.
APPLICATION FILED APR. 17, 1919.
1,356,972.
Patented Oct. 26, 1920.
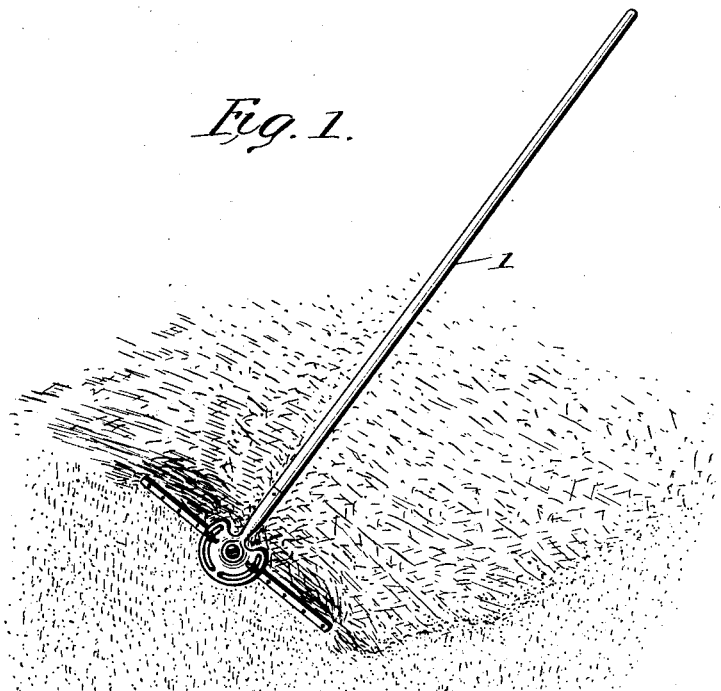
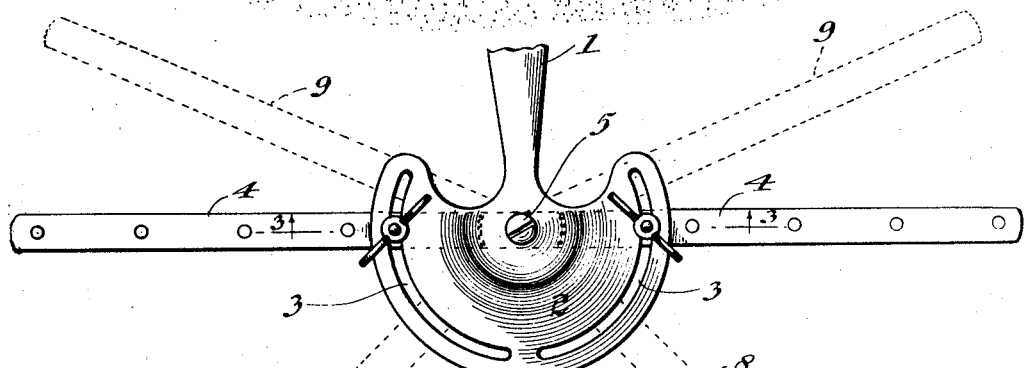
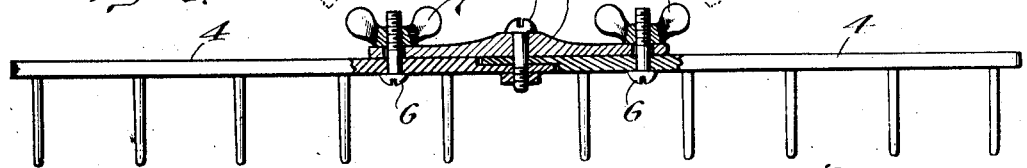
Inventor
Caleb Crisman
By Hill & Hill
Attys.

UNITED STATES PATENT OFFICE.

CALEB CRISMAN, OF CHICAGO, ILLINOIS.

GARDEN IMPLEMENT.

1,356,972.     Specification of Letters Patent.     Patented Oct. 26, 1920.

Application filed April 17, 1919. Serial No. 290,746.

*To all whom it may concern:*

Be it known that I, CALEB CRISMAN, a citizen of the United States, residing at Chicago, in the county of Cook and State of Illinois, have invented certain new and useful Improvements in Garden Implements, of which the following is a description.

My device belongs to that general class of devices more especially employed for garden or agricultural use, and is shown as exemplified in what may be termed a garden rake. It has for its object the production of a simple and effective device of the character named which may be economically constructed, and adjustable to be adapted to various uses or in positions where an implement not possessing such adjustable features would not be available.

To this end it consists in the novel construction, arrangement and combination of parts herein shown and described, and more particularly pointed out in the claim.

In the drawings, wherein like reference characters indicate like or corresponding parts, Figure 1 is a perspective view of my improvement as adapted to a garden or hay rake;

Fig. 2 is a top plan view of the end of the implement, clearly showing the head of the rake; and Fig. 3 is an end elevation of the implement partly in section on line 3—3 of Fig. 2.

In the drawings, 1 represents the handle of an ordinary garden implement provided at its end with a head 2. This head on each side of its center is provided with an adjusting slot 3. These slots are curved, as indicated, and extend generally in the same direction as the handle. 4—4 are rake arms pivotally supported on the head preferably at a central point, as at 5, and adapted to extend transversely to the handle head. Bolts 6—6 carried by the arms 4 extend upwardly through the slots 3 and are provided with nuts 7—7, which are preferably thumb nuts. By this means, upon loosening the nuts, the arms 4 may be adjusted on the pivotal center 5, or on an equivalent support, so that they may be caused to extend in any desired adjusted position within the limits of the device. When adjusted to such position, the thumb nuts may be again tightened, maintaining the parts in rigid position in operation. By this means the aggregate width of the rake may be modified substantially as desired, so that it may be used between plants arranged in rows. Thus, as shown in dotted lines 8—8, the rake would be narrowed to a considerable extent. The slots may be carried forward as far as may be, even to the point where the two arms would lie substantially side by side. In the preferred construction, the slots at the handle end are extended well upward, so that the arms, as at dotted lines 9—9, may be extended forward to secure a gathering effect, and at the same time narrow the rake also if desired.

It is obvious that the arms need not be mounted upon a common center, so long as the radius from the center to the slot is sufficient to permit the adjusting feature mentioned. In the form shown, the center 5 is used as a center with a radius to form the slots as indicated, and is the preferred construction.

While I have shown my device as applied to a rake, it is obvious that it may be applied to other implements as may be found desirable; hence I do not wish to be understood as limiting my invention to the exact form of construction shown.

Having thus described my invention, what I claim as new and desire to secure by Letters Patent is:—

An implement of the character described having a relatively wide segmental shaped head of a flat formation along its under side, and provided with an extended handle receiving portion projecting from the head, and a handle adapted to be attached to said handle receiving portion, said segmental head having arcuate slots therein near the outer edges of the head spaced from each other, of a pair of rake arms, each having an end reduced in thickness, and means coöperating with the head for pivotally supporting the rake arms for independent adjustment comprising a single pivot pin passing through each of the overlapped reduced ends of the arms for holding said arms in contact with the flat surface of the head, bolts passing through openings in each of the arms, and disposed within the arcuate slots in the head and adjusting nuts coöperating with the bolts and the outer surface of the head for maintaining the arms in their separate adjusted positions.

In testimony whereof I have hereunto signed my name in the presence of two subscribing witnesses.

CALEB CRISMAN.

Witnesses:
 JOHN W. HILL,
 CHARLES I. COBB.